(12) United States Patent
Park et al.

(10) Patent No.: US 9,581,186 B2
(45) Date of Patent: Feb. 28, 2017

(54) RIVET STUD BOLT AND PANEL JOINT STRUCTURE OF THE SAME

(71) Applicant: SUNGWOO HITECH CO., LTD., Busan (KR)

(72) Inventors: Byung Joon Park, Yangsan-si (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 283 days.

(21) Appl. No.: 14/258,110

(22) Filed: Apr. 22, 2014

(65) Prior Publication Data

US 2015/0226253 A1 Aug. 13, 2015

(30) Foreign Application Priority Data

Feb. 10, 2014 (KR) ........................ 10-2014-0015080
Mar. 19, 2014 (KR) ........................ 10-2014-0032293

(51) Int. Cl.
*F16B 37/04* (2006.01)
*F16B 37/06* (2006.01)
*F16B 33/00* (2006.01)

(52) U.S. Cl.
CPC .......... *F16B 37/062* (2013.01); *F16B 33/002* (2013.01)

(58) Field of Classification Search
CPC ... F16B 39/284; F16B 19/05; Y10T 29/49966
USPC .................................................. 411/107, 181
See application file for complete search history.

(56) References Cited

U.S. PATENT DOCUMENTS

| 1,502,399 | A | * | 7/1924 | Renner | F16B 37/062 411/180 |
| 1,705,086 | A | * | 3/1929 | Ferguson | F16B 35/06 411/107 |
| 4,430,034 | A | * | 2/1984 | Fujikawa | B23P 19/062 29/432 |
| 4,533,288 | A | * | 8/1985 | Rivkin | F16B 15/04 411/176 |
| 5,489,176 | A | * | 2/1996 | Fultz | B23P 19/062 29/432.2 |
| 5,644,830 | A | * | 7/1997 | Ladouceur | B23P 19/062 29/432.2 |
| 7,287,944 | B2 | | 10/2007 | Ladouceur | |
| 7,425,111 | B2 | * | 9/2008 | Ladouceur | B23P 19/062 29/432.1 |
| 8,202,134 | B2 | * | 6/2012 | Moon | H01M 2/0473 439/878 |
| 8,230,571 | B2 | * | 7/2012 | Kovac | B23P 19/062 29/243.53 |

(Continued)

FOREIGN PATENT DOCUMENTS

CN 1820291 8/2006
JP 2006-503244 1/2006

(Continued)

*Primary Examiner* — Gary Estremsky
(74) *Attorney, Agent, or Firm* — Lex IP Meister, PLLC

(57) ABSTRACT

A rivet stud bolt is disclosed. A rivet stud bolt for mounting an element to at least one panel includes a bolt portion to which the panel is assembled, a flange integrally formed to an end of the bolt portion, and a rivet portion integrally connected to the flange, in which at least two slits are formed, and the rivet portion is plastically deformed and connected to the panel.

19 Claims, 18 Drawing Sheets

(56) References Cited

U.S. PATENT DOCUMENTS

| | | | |
|---|---|---|---|
| 8,366,364 B2* | 2/2013 | Maloney | F16B 37/068 |
| | | | 411/107 |
| 2004/0076489 A1 | 4/2004 | Ladouceur | |
| 2005/0111934 A1 | 5/2005 | Ladouceur | |
| 2006/0093457 A1* | 5/2006 | Cao | F16B 37/048 |
| | | | 411/181 |
| 2006/0115344 A1 | 6/2006 | Ladouceur | |
| 2011/0294367 A1 | 12/2011 | Moon et al. | |
| 2013/0094924 A1 | 4/2013 | Lee et al. | |

FOREIGN PATENT DOCUMENTS

| | | |
|---|---|---|
| JP | 4294644 | 7/2009 |
| KR | 10-2013-0042350 | 4/2013 |

\* cited by examiner

FIG. 17
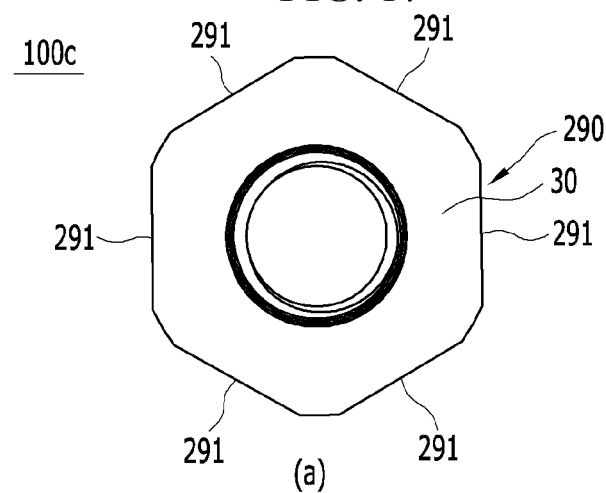
(a)
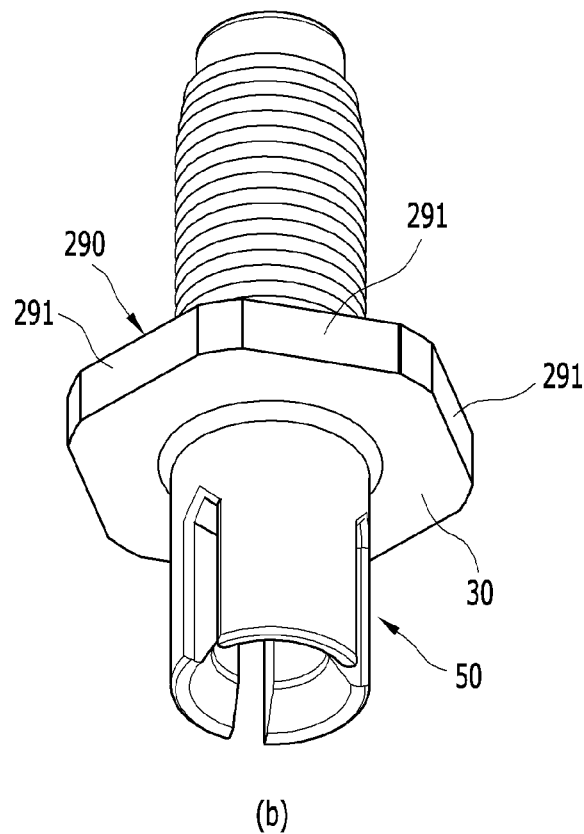
(b)

RIVET STUD BOLT AND PANEL JOINT STRUCTURE OF THE SAME

CROSS-REFERENCE TO RELATED APPLICATION

This application claims priority to and the benefit of Korean Patent Application No. 10-2014-0015080 filed in the Korean Intellectual Property Office on Feb. 10, 2014, and Korean Patent Application No. 10-2014-0032293 filed in the Korean Intellectual Property Office on Mar. 19, 2014, the entire contents of which are incorporated herein by reference.

BACKGROUND OF THE INVENTION (a) Field of the Invention

The present invention relates to a stud bolt. More particularly, the present invention relates to a rivet stud bolt (RSB) for mechanically assembling an element to a base such as a panel, and a panel joint structure with the rivet stud bolt.

(b) Description of the Related Art

In automotive industries, a weld bolt, a weld nut, a stud bolt, and so on are applied to mount an element such as an engine, a transmission, a steering system, and so on to a base such as a vehicle panel, a frame, and so on.

Generally, a stud bolt including a bolt portion and a flange is connected to the base by welding the flange to the base.

For example, the flange of the stud bolt is instantaneously melted by arc discharge then the flange is welded to the base.

However, in arc welding, soot is generated near the welding portion of the base and the flange portion, positions of the stud bolt are various, deformation of the welded portion may be generated, and the stud bolt may be easily disassembly due to weak connecting strength.

For overcoming the drawbacks described above, a stud bolt including a bolt portion, a flange and a rivet portion integrally formed for mechanical connection has been developed, for example, U.S. Pat. No. 7,287,944.

In mechanical connection using the stud bolt, an assembling hole is formed to a base, the rivet portion is inserted into the assembling hole, and then the rivet portion is plastically deformed by pressing the stud bolt to connect the stud bolt to the base.

In this case, the rivet portion shaped as a hollow cylinder is plastically deformed to fit the base.

For example, the rivet portion of the rivet stud bolt penetrates the hole of the base by a punch of a setting tool, is outwardly deformed by a forming groove of a die (also called an anvil), and then is press-fitted to the base.

However, the plastically deformed portion is deformed as a ring so that the connection strength of the rivet portion is not sufficient.

Therefore, the stud bolt may be rotated.

Also, since the end of the rivet portion is deformed as an annular edge, the setting tool requires a heavy load for plastically deforming the rivet portion.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rivet stud bolt for mechanically assembling an element to a base and a panel joint structure with the rivet stud bolt having advantages of enhancing joining strength of joining objects, and reducing a joining load of a setting tool for plastically deforming a rivet portion.

A rivet stud bolt according to exemplary embodiments of the present invention integrally joins an element to a base such as at least one panel. In one or more exemplary embodiments, a rivet stud bolt may include a bolt portion to which the panel is assembled, a flange integrally formed to an end of the bolt portion, and a rivet portion integrally connected to the flange, in which at least two slits are formed, and the rivet portion is plastically deformed and connected to the panel.

In one or more exemplary embodiments, the rivet portion is formed as a cylinder shape shank, the rivet portion includes a connecting end connected to the flange and a free end being an opposite end of the connecting end, and the slits are extended from the free end to the connecting end of the rivet portion.

In one or more exemplary embodiments, a length of the slit is shorter than that of the rivet portion, and the slits are circumferentially disposed at the rivet portion at a constant interval.

In one or more exemplary embodiments, the rivet portion includes a first portion integrally connected to the flange and having a circular cross-section, and a plurality of second portions integrally connected to the first portion and disposed between the slits.

In one or more exemplary embodiments, the slit is provided with a triangular groove at the first portion, and the groove is connected to a space between the second portions.

In one or more exemplary embodiments, a rotation preventing portion is formed to an edge of the flange.

In one or more exemplary embodiments, the rotation preventing portion is formed as teeth continuously formed to the edge of the flange.

In one or more exemplary embodiments, the rotation preventing portion includes at least one straight portion formed to the edge of the flange.

In one or more exemplary embodiments, the rotation preventing portion includes a plurality of protrusion formed to the edge of the flange.

A panel joint structure according to exemplary embodiments of the present invention may mount an element to at least one panel with the rivet stud bolt according to exemplary embodiments of the present invention. In one or more exemplary embodiments, the rivet portion of the rivet stud bolt is inserted into an assembling hole formed to the panel, and the rivet portion is plastically deformed and is press-fitted to a plurality of jointing portion of the panel through the slits.

In one or more exemplary embodiments, the rivet portion penetrates the assembling hole, is outwardly plastically deformed, supports the panel, and is connected to the panel as a staple shape.

In one or more exemplary embodiments, the rivet portion is plastically deformed and press-fitted to a plurality of jointing portion of a lower portion of the panel through the slits.

In one or more exemplary embodiments, a rotation preventing portion is formed to an edge of the flange.

A panel joint structure according to exemplary embodiments of the present invention may mount an element to at least one panel with the rivet stud bolt according to exemplary embodiments of the present invention. In one or more exemplary embodiments, the rivet portion of the rivet stud bolt penetrates the panel, is outwardly plastically deformed, and is press-fitted to a plurality of jointing portion of the panel through the slits.

In one or more exemplary embodiments, the rivet portion connects a portion of the panel corresponding to the inner space with other portions of the panel corresponding to the slits.

In one or more exemplary embodiments, a rotation preventing portion is formed to an edge of the flange.

A panel joint structure according to exemplary embodiments of the present invention may mount an element to at least one panel with the rivet stud bolt according to exemplary embodiments of the present invention. In one or more exemplary embodiments, the rivet portion of the rivet stud bolt is outwardly plastically deformed, and is press-fitted to a plurality of jointing portion of the panel through the slits without complete penetration of the panel; and the rivet portion connects a portion of the panel corresponding to the inner space with other portions of the panel corresponding to the slits.

In one or more exemplary embodiments, a protruding portion is formed to a lower surface of the panel corresponding to the rivet portion.

In one or more exemplary embodiments, a rotation preventing portion is formed to an edge of the flange.

A panel joint structure according to exemplary embodiments of the present invention may mount an element to at least two panels with the rivet stud bolt according to exemplary embodiments of the present invention. In one or more exemplary embodiments, the rivet portion of the rivet stud bolt penetrates upper panels except for a lowest panel, is outwardly plastically deformed, and is press-fitted to a plurality of jointing portions of the lowest panel through the slits, and the rivet portion connects a portion of the upper panels corresponding to the inner space with other portions of the upper panels corresponding to the slits.

In one or more exemplary embodiments, the panels are integrally assembled by the rivet portion.

In one or more exemplary embodiments, a protruding portion is formed to a lower surface of the lowest panel corresponding to the rivet portion.

In one or more exemplary embodiments, a rotation preventing portion is formed to an edge of the flange.

According to the exemplary embodiments of the present invention, since a plurality of slits are formed to a rivet portion, joining strength of a stud bolt with a base may be enhanced and rotation of the stud bolt may be prevented.

According to the exemplary embodiments of the present invention, since a plurality of slits are formed to a rivet portion, a joining load applied to the stud bolt by a joining system may be reduced, operation stability of the joining system may be enhanced, and a quantity of materials for manufacturing the stud bolt may be reduced.

In some exemplary embodiments, since an assembling hole is not required in a panel or a base, productivity may be improved, manufacturing processes may be simplified, and manufacturing cost may be reduced.

Since a rotation preventing portion is formed to an edge of a flange, a rotation preventing force against the panel or the base may be provided.

BRIEF DESCRIPTION OF THE DRAWINGS

The drawings illustrate exemplary embodiments of the present invention and are not construed to limit any aspect of the invention.

FIG. 16 to FIG. 18 are drawings showing a stud bolt according to one or more other variants of exemplary embodiments of the present invention.

<Description of Symbols>

Figure 1:
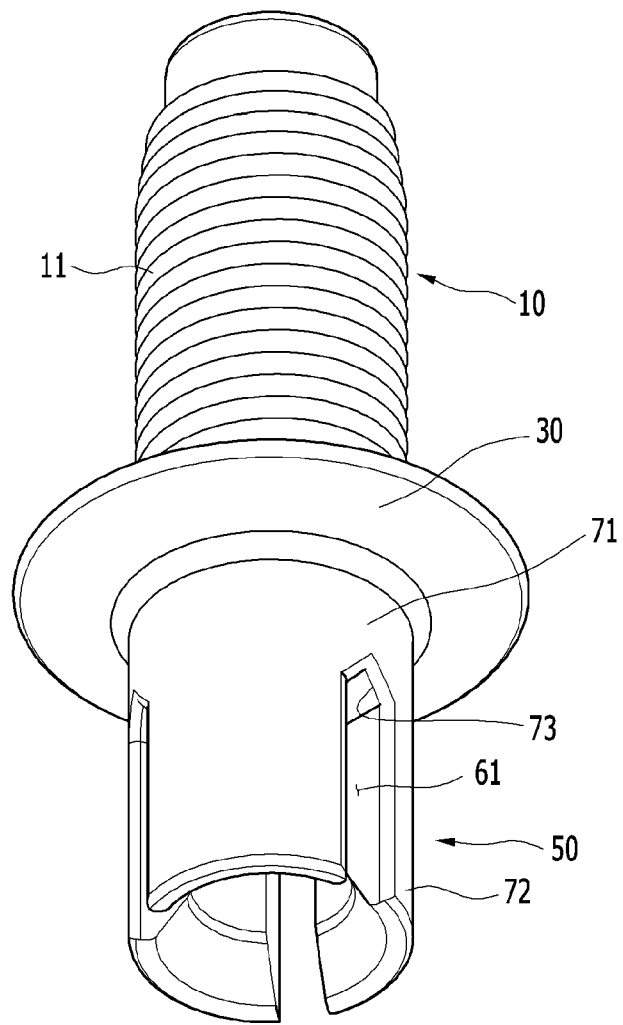
FIG. 1 is a perspective view of a rivet stud bolt according to one or more exemplary embodiments of the present invention.

| | |
|---|---|
| 1, 2: base | 3: assembling hole |
| 9: protruding portion | 10: bolt portion |
| 11: thread | 30: flange |
| 50: rivet portion | 61: slit |
| 71: first portion | 72: second portion |
| 73: groove | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, sizes and thicknesses of components shown in the drawings may differ from actual sizes and real thicknesses of the components for better comprehension and ease of description. Therefore, the present invention is not limited to those shown in the drawings.

In the detailed description, ordinal numbers are used for distinguishing constituent elements having the same terms, and have no specific meanings.

In the specification, unless explicitly described to the contrary, the word "comprise" and variations such as "comprises" or "comprising" will be understood to imply the inclusion of stated elements but not the exclusion of any other elements.

In the specification, terms such as "portion" and "means" mean a unit of a comprehensive element having at least one function or movement.

Figure 2:
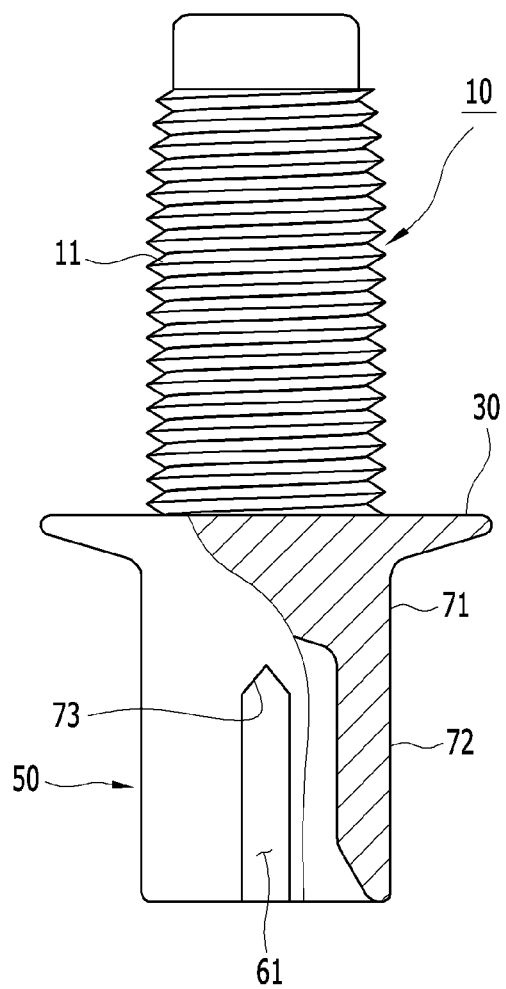
FIG. 2 is a partial cross-sectional view of a rivet stud bolt according to one or more exemplary embodiments of the present invention.
Figure 3:
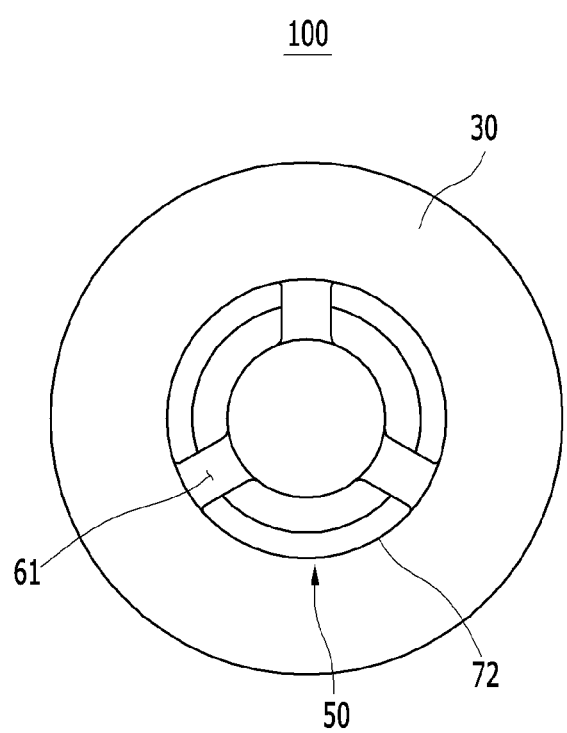
FIG. 3 is a bottom view of a rivet stud bolt according to one or more exemplary embodiments of the present invention.
Figure 4:
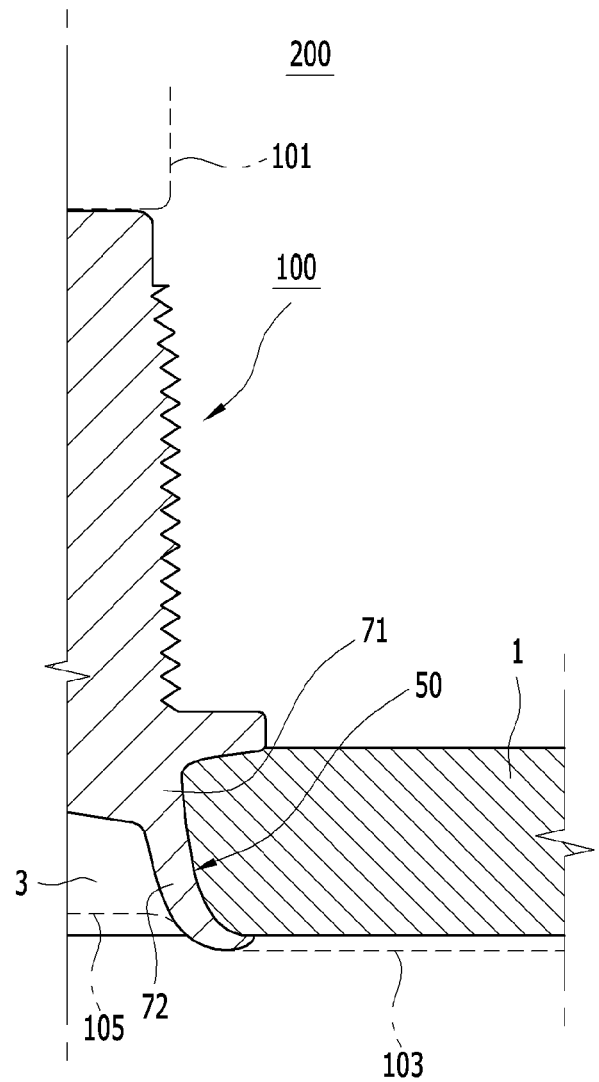
FIG. 4 is a drawing showing a first panel joint structure of the rivet stud bolt according to one or more exemplary embodiments of the present invention.

FIG. 1 is a perspective view of a rivet stud bolt according to one or more exemplary embodiments of the present invention, and FIG. 2 is a partial cross-sectional view of a rivet stud bolt according to one or more exemplary embodiments of the present invention. FIG. 3 is a bottom view of a rivet stud bolt according to one or more exemplary embodiments of the present invention, and FIG. 4 is a drawing showing a first panel joint structure of the rivet stud bolt according to one or more exemplary embodiments of the present invention.

In the specification, joining objects may be defined as basic materials for joining with a rivet stud bolt, a joined article may be defined as a processed article of which the joining objects are joined by riveting, and a rivet stud bolt 100 may be defined as a SRS (Sungwoo Rivet Stud-bolt).

A base (1: referring to FIG. 4 to FIG. 9) may be defined as a panel applied to vehicle body. However, the base 1 may not be limited to a vehicle body panel, and on the contrary, may include a frame and so on which constitutes a vehicle body.

Also, the scope of the present invention may not be limited to assembling a vehicle body, and may be applied to assembling elements to any structure.

Referring to FIG. 1 to FIG. 4, a rivet stud bolt 100 according to one or a plurality of exemplary embodiments of the present invention may be applied to assembly or joining elements, for example an engine, a transmission, a steering system, and a vehicle body to at least one base 1 by bolting.

In the specification, for better comprehension, an upper portion or upper direction of the rivet stud bolt 100 of the drawings may be described as an upper portion or upper direction of the rivet stud bolt, and a lower portion or lower direction of the rivet stud bolt 100 of the drawings may be described as a lower portion or lower direction of the rivet stud bolt.

Further, in describing more than two bases 1 in the drawings, a base disposed highest is described as an upper base, and a base disposed lowest is described as a lower base.

The terms described above are defined for better comprehension, and thus the terms may not limit the spirit or scope of the present invention and other definitions may be used in various situations in the specification for better comprehension.

The rivet stud bolt 100 is mechanically assembled or joined to a base 1 through a stud bolt assembling or joining system.

The stud bolt joining system pushes or pressurizes the rivet stud bolt 100 to the base 1 so that the rivet stud bolt 100 is plastically deformed to be integrally connected to the base 1.

In an exemplary embodiment of the present invention, the base 1 is made of a plastic material, a rubber material, an aluminum panel, or a steel panel (including a high-tension steel panel). The base 1 may be at least two panels can be made of the same material or different materials.

The rivet stud bolt 100 may be made of an aluminum material or a steel material.

The stud bolt joining system includes a punch unit 101 for pressing the rivet stud bolt 100 and a die 103 (also called an anvil) for supporting the base 1 corresponding to the punch unit 101.

The punch unit 101 feeding the rivet stud bolt 100 includes a punch cylinder driven by hydraulic pressure or pneumatic pressure, and a punch operated by a punch cylinder.

The punch unit 101 may use a hitting apparatus for speedy and continuously impacting the rivet stud bolt 100.

The punch unit 101 of the stud bolt joining system is well-known to a person skilled in the art, and thus a detailed description thereof will be omitted in this specification.

The die 103 supporting and absorbing an impact force during the rivet driving operation supports the base 1. In the die 103, a forming groove 105 is formed for inducing plastic deforming of the stud bolt 100.

The rivet stud bolt 100 according to one or a plurality of exemplary embodiments of the present invention may mechanically assemble an element to the base 1 while enhancing joining strength of joining objects, and reducing joining load applied to the punch unit 101.

The rivet stud bolt 100 includes a bolt portion 10, flange 30, and a rivet portion 50.

The bolt portion 10 is used for joining elements to the base 1, and a thread 11 is formed to an external circumferential surface thereof.

The flange 30 receives the load of the punch unit 101, is integrally formed under the bolt portion 10, has a disk shape having a predetermined thickness, is extended outwardly, and supports an upper portion of the base 1.

In exemplary embodiments of the present invention, the rivet portion 50 is plastically deformed by the load of the punch unit 101 along the forming groove 105 of the die 103, is integrally connected to the flange 30, and is formed as a shank with a hollow cylinder shape.

A portion of the rivet portion 50 connected to the flange 30 is defined as a connecting end, and the end opposite to the connecting end is defined as a free end.

At least two slits 61 are formed to the rivet portion 50. The slits 61 are extended from the free end to the connecting end of the rivet portion 50, and are connected to an inner space of the rivet portion 50.

In addition, a length of the slits 61 is shorter than that of the rivet portion 50, and the slits 61 are disposed circumferentially at the rivet portion 50 with a constant distance therebetween.

For example, three slits 61 are circumferentially disposed at the rivet portion 50, and a central angle formed by two slits 61 is 120 degrees.

The rivet portion 50 according to exemplary embodiments of the present invention includes a first portion 71 integrally connected to the flange 30, and a plurality of second portions 72 integrally connected to the first portion 71 and disposed between the slits 61.

The first portion 71 is integrally connected to the flange portion 30 and is adapted to support the second portions 72. The first portion 71 does not have a hollow shape but has a circular cross-section.

The second portion 72 is integrally connected to the first portion 71 and forms a space therein. The second portion 72 is outwardly deformed according to the forming groove 103 of the die 103 such that the second portion 72 is press-fitted into the base 1.

The slits 61 are provide with a triangular groove 73, and the space between the second portions 72 is connected with the groove 73. In this case, the groove 73 can be formed by a protrusion of a die for forming the slit 61 at the rivet portion 50 when the rivet stud bolt 100 according to exemplary embodiments of the present invention is forged by the die.

The rivet portion 50 is provided with three slits 61 at 120 degrees. However, it is not limited thereto, and on the contrary, various numbers and intervals between each slit may be selected according to strength of the base 1 and connecting torque of the rivet stud bolt 100.

Hereinafter, a panel joint structure for mounting an element to the base 1 such as a panel with the rivet stud bolt 100 according to exemplary embodiments of the present invention will be described with the accompanying drawings.

FIG. 4 is a drawing showing a first panel joint structure of the rivet stud bolt according to one or more exemplary embodiments of the present invention.

Referring to FIG. 4, a first panel joint structure 200 according to exemplary embodiments of the present invention is formed with at least one base 1, for example with at least one panel of which an assembling hole 3 is formed thereto, and the rivet stud bolt 100 mechanically connected to the base 1.

For forming the first panel joint structure 200, the rivet stud bolt 100 is supplied to the punch unit 101 of the stud bolt joining system, and the base 1 where the assembling hole 3 is formed is disposed between the punch unit 101 and the die 103.

Then, the rivet portion 50 of the rivet stud bolt 100 is inserted into the assembling hole 3, and then the punch unit 101 applies a load to the rivet stud bolt 100.

Then, in a state in which the second portion 72 of the rivet portion 50 is supported by the first portion 71, the second portion 72 of the rivet portion 50 is outwardly deformed according to the forming groove 105 of the die 13 by the load of the punch unit 101, and is press-fitted into the lower portion of the base 1 through the slits 61 (referring to FIG. 1 to FIG. 3) with a plurality of jointing portions.

That is, for example since the second portion 72 is divided into three sections by the slits 61, the rivet portion 50 is plastically deformed and is press-fitted to three jointing portions of the base 1.

The rivet portion 50 penetrates the assembling hole 3, is outwardly plastically deformed, and is connected to the lower portion of the base 1 as a staple shape with a plurality of jointing portion.

According to the first panel joint structure 200 of the exemplary embodiments of the present invention, since the rivet portion 50 is plastically deformed and the second portions 72 are press-fitted to a plurality of jointing portions of the base 1 through the slits 61, the joining characteristic and joining strength (joining torque) of the rivet stud bolt 100 and the base 1 may be enhanced.

Since the second portions 72 of the rivet portion 50 are press-fitted to a plurality of jointing portions apart from each other, connecting force may be enhanced to prevent the stud bolt 100 from being rotated.

Also, since a plurality of slits 61 are formed to the rivet portion 50, the joining load of the punch unit 101 applied to the rivet portion 50 may be reduced, so that operation stability may be enhanced and material quantity of the stud bolt 100 may be reduced.

Figure 5:
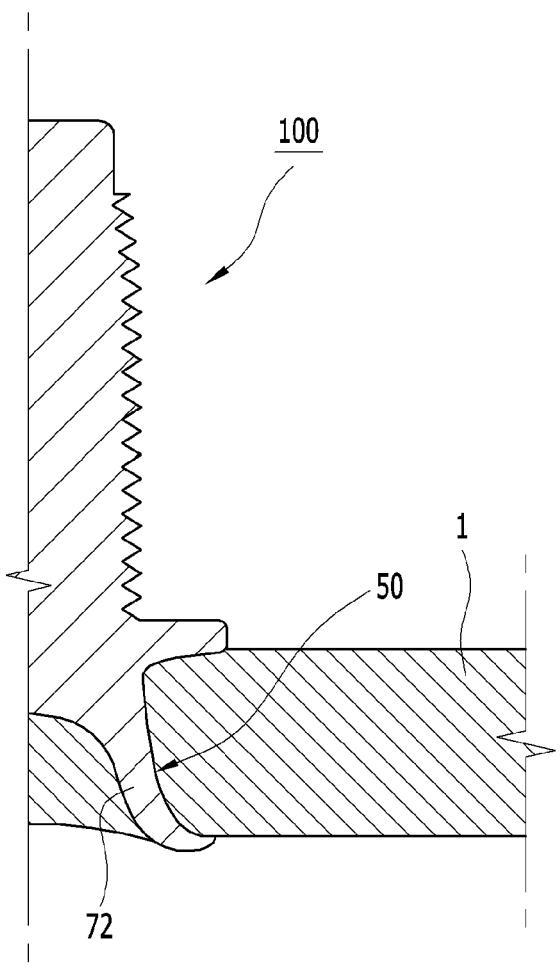
FIG. 5 and FIG. 6 are drawings showing a second panel joint structure of the rivet stud bolt according to one or more exemplary embodiments of the present invention.
Figure 6:
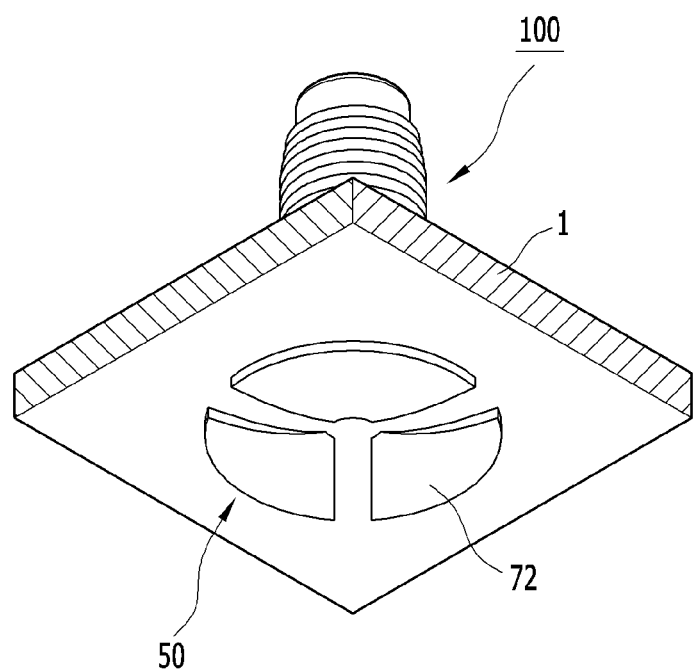

FIG. 5 and FIG. 6 are drawings showing a second panel joint structure of the rivet stud bolt according to one or more exemplary embodiments of the present invention.

Referring to FIG. 5 and FIG. 6, a second panel joint structure 300 according to exemplary embodiments of the present invention is formed with at least one base 1, for example with at least one panel of which an assembling hole 3 is not formed thereto, and the rivet stud bolt 100 mechanically connected to the base 1.

For forming the second panel joint structure 300, the rivet stud bolt 100 is supplied to the punch unit 101 of the stud bolt joining system and the base 1 without an assembling hole 3 is disposed between the punch unit 101 and the die 103.

Then, the second portion 72 of the rivet portion 50 penetrates the base 1, is outwardly deformed according to the forming groove 105 of the die 13 by the load of the punch unit 101, and is press-fitted into the lower portion of the base 1 through the slits 61 with a plurality of jointing portions.

That is, for example, since the second portion 72 is divided into three sections by the slits 61, the rivet portion 50 is plastically deformed and is press-fitted to three jointing portions of the base 1.

For example, since the second portion 72 is divided into three sections by the slits 61, the rivet portion 50 is plastically deformed and is press-fitted to three jointing portions of the base 1, and the rivet portion 50 connects a portion of the base 1 corresponding to the inner space with other portions of the base 1 corresponding to the slits 61.

When the second portions 72 penetrate the base 1, the portion corresponding to the inner space of the second portions 72 is not cut off and is connected to the other portion of the base 1 corresponding to the slits 61.

The second portion 72 of the rivet portion 50 penetrates the base 1, is outwardly plastically deformed, and is connected to the lower portion of the base 1 as a staple shape with a plurality of jointing portions.

According to the second panel joint structure 300 of the exemplary embodiments of the present invention, since the rivet portion 50 penetrates the base 1, is plastically deformed, and is press-fitted to a plurality of jointing portions of the base 1 through the slits 61, the joining characteristic and joining strength (joining torque) of the rivet stud bolt 100 and the base 1 may be enhanced.

Since the portion of the base 1 corresponding to the inner space of the second portions 72 can be connected to the other portions of the base 1 corresponding to the slits 61 by the slits 61 of the rivet portion 50, the penetrated portion of the base 1 is not cut off completely. Thus, mechanical interlock may be achieved.

Because a penetrated portion of joining objects is not cut off completely and does not remain as dead metal, the penetrated portion is used for reinforcing joining strength of the joining objects.

Since the second portion 72 of the rivet portion 50 is press-fitted to a plurality of jointing portions apart from each other, the connecting force may be enhanced to prevent for the stud bolt 100 from being rotated.

Also, since a plurality of slits 61 are formed to the rivet portion 50, the joining load of the punch unit 101 applied to the rivet portion 50 may be reduced, so that operation stability may be enhanced and material quantity of the stud bolt 100 may be reduced.

Since it is not required to form an assembling hole to the base 1, productivity may be improved, and manufacturing processes and manufacturing cost may be reduced.

Figure 7:
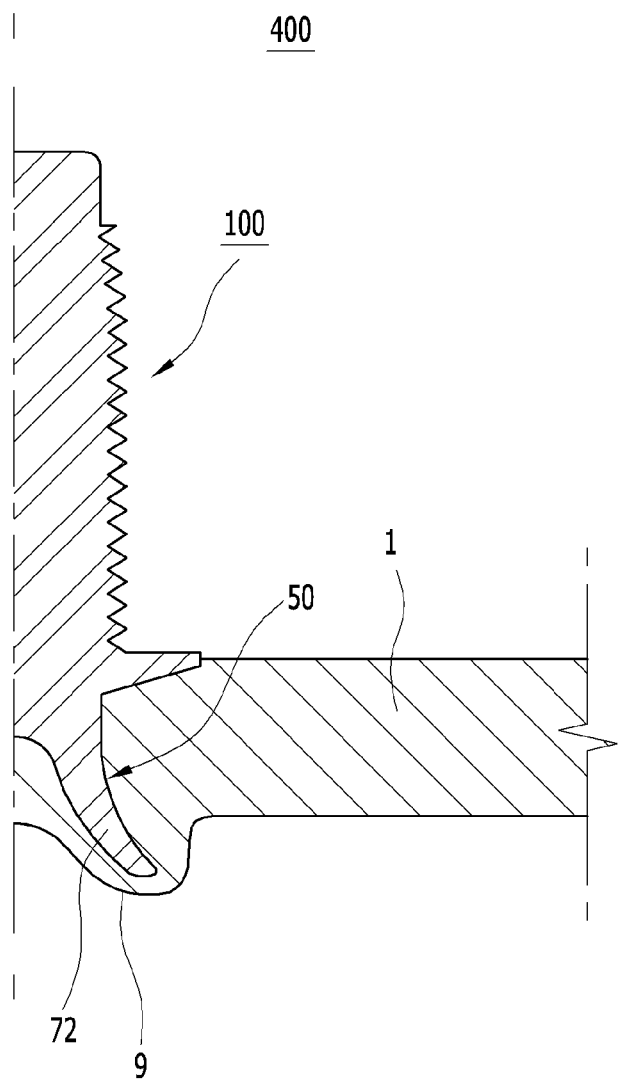
FIG. 7 is a drawing showing a third panel joint structure of the rivet stud bolt according to one or more exemplary embodiments of the present invention.

FIG. 7 is a drawing showing a third panel joint structure of the rivet stud bolt according to one or more exemplary embodiments of the present invention.

Referring to FIG. 7, a third panel joint structure 400 according to exemplary embodiments of the present invention is formed with at least one base 1, for example with at least one panel of which an assembling hole 3 is not formed thereto, and the rivet stud bolt 100 mechanically connected to the base 1 without completely penetrating the base 1.

For forming the third panel joint structure 400, the rivet stud bolt 100 is supplied to the punch unit 101 of the stud bolt joining system, and the base 1 without an assembling hole 3 is disposed between the punch unit 101 and the die 103.

Then, the second portion 72 of the rivet portion 50 is outwardly deformed according to the forming groove 105 of the die 13 by the load of the punch unit 101 without completely penetrating the base 1, and is press-fitted into the lower portion of the base 1 through the slits 61 with a plurality of jointing portions.

For example, since the second portion 72 is divided into three sections by the slits 61, the rivet portion 50 is plastically deformed and is press-fitted to three jointing portions of the base 1, and the rivet portion 50 connects a portion of the base 1 corresponding to the inner space with other portions of the base 1 corresponding to the slits 61. In this case, a protruding portion 9 may be formed to a lower surface of the base 1 corresponding to the rivet portion 50.

When the second portions 72 are outwardly deformed to be press-fitted into the lower portion of the base 1, a portion corresponding to the inner space of the second portions 72 is not cut off and is connected to the other portion of the base 1 corresponding to the slits 61. Thus, mechanical interlock may be achieved.

According to the third panel joint structure 300 of the exemplary embodiments of the present invention, since the rivet portion 50 is plastically deformed and is press-fitted to a plurality of jointing portions of the base 1 through the slits 61, the joining characteristic and joining strength (joining torque) of the rivet stud bolt 100 and the base 1 may be enhanced. Also, since a plurality of slits 61 are formed to the rivet portion 50, the joining load of the punch unit 101 applied to the rivet portion 50 may be reduced, so that operation stability may be enhanced and material quantity of the stud bolt 100 may be reduced.

Since it is not required to form an assembling hole to the base 1, productivity may be improved, and manufacturing processes and manufacturing cost may be reduced.

Figure 8:
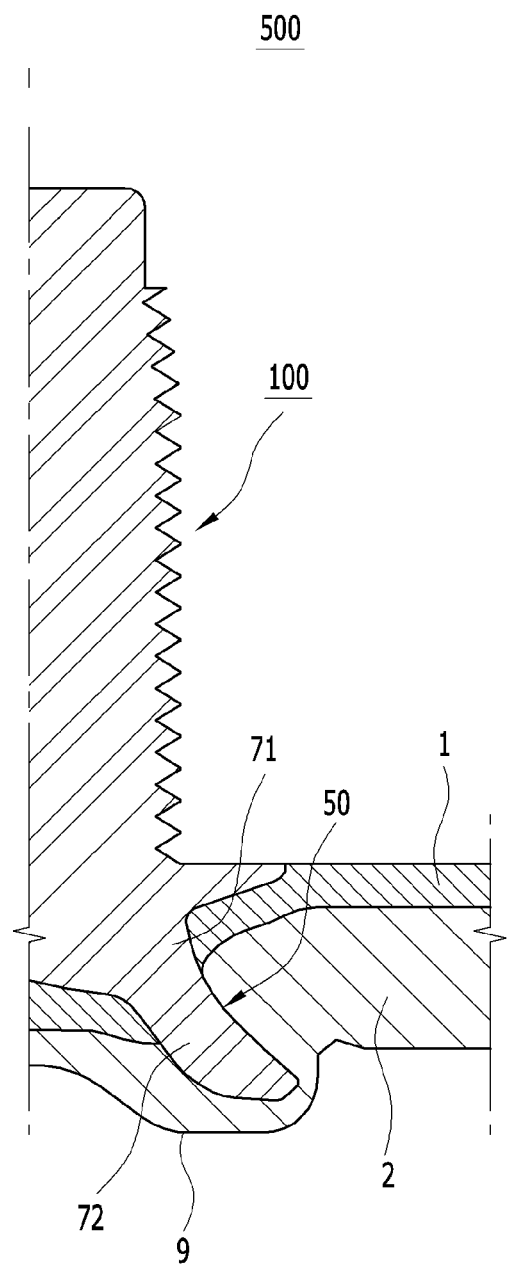
FIG. 8 and FIG. 9 are drawings showing a fourth panel joint structure of the rivet stud bolt according to one or more exemplary embodiments of the present invention.
Figure 9:
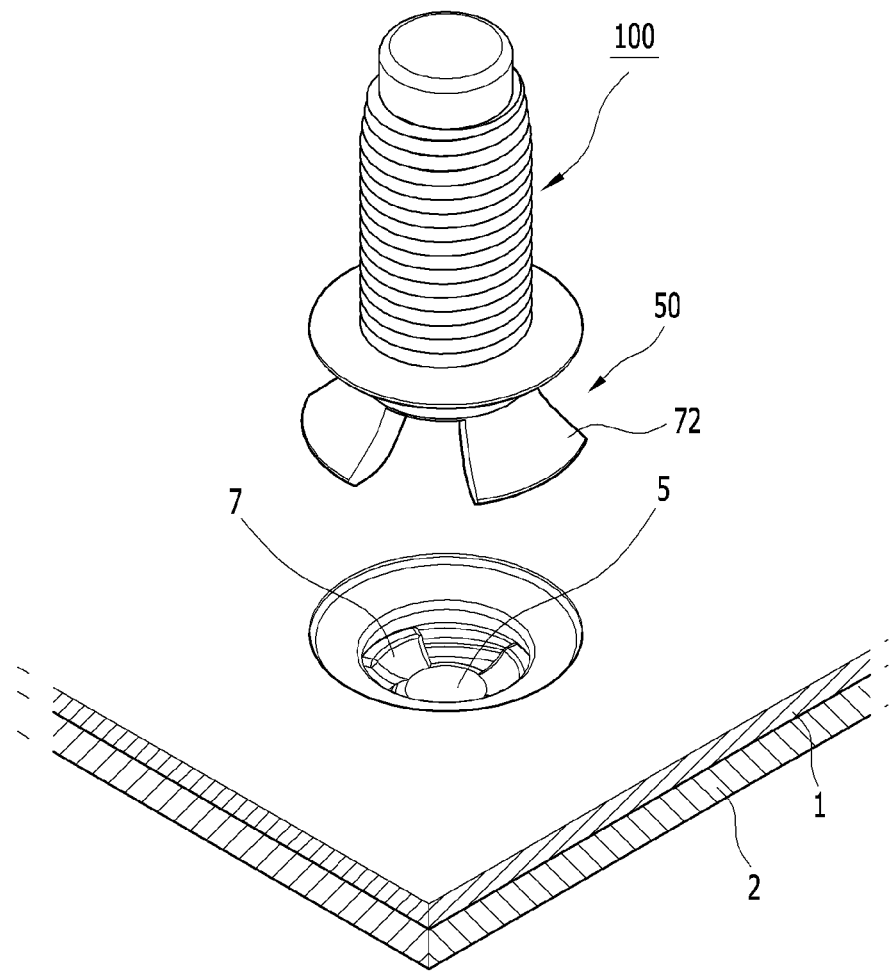

FIG. 8 and FIG. 9 are drawings showing a fourth panel joint structure of the rivet stud bolt according to one or more exemplary embodiments of the present invention.

Referring to FIG. 8 and FIG. 9, a fourth panel joint structure 500 according to exemplary embodiments of the present invention is formed with at least two bases 1 and 2, for example with at least two panels of which an assembling hole 3 is not formed thereto, and the rivet stud bolt 100 mechanically connected to the bases 1 and 2.

For forming the fourth panel joint structure 500, the rivet stud bolt 100 is supplied to the punch unit 101 of the stud bolt joining system, and the bases 1 and 2 without an assembling hole 3 are disposed between the punch unit 101 and the die 103.

Then, the second portion 72 of the rivet portion 50 penetrates the upper base 1, is outwardly deformed according to the forming groove 105 of the die 13 by the load of the punch unit 101, and is press-fitted into the lower base 2 through the slits 61 with a plurality of jointing portions.

That is, the second portion 72 of the rivet portion 50 penetrates the upper base 1, is outwardly plastically deformed along the forming groove 105 of the die 103, and is press-fitted into the lower base 2 to integrally connect the upper and lower bases 1 and 2.

The second portion 72 is pressed to be fitted into the lower base 2 but not completely penetrate the lower base 2, and deformed ends are encapsulated within the lower base 2 such that mechanical interlock between the upper and the lower bases 1 and 2 is formed so as to integrally connect the upper and lower bases 1 and 2.

When the second portions 72 penetrate the base 1, the portion 5 corresponding to the inner space of the second portions 72 is not cut off and is connected to the other portion 7 of the base 1 corresponding to the slits 61.

That is, a deformed portion of the upper base 1 corresponding to the inner space of the second portion and other deformed portion of the upper base 1 corresponding to the slits 61 are connected to each other.

That is, when the second portion 72 penetrates the upper base 1, the deformed portion of the upper base 1 corresponding to the inner space of the second portion is not cut off completely, but is connected to the other deformed portion of the upper base 1 corresponding to the slits 61.

Further, the other deformed portions of the upper base 1 corresponding to the slits 61 are connected except for a joining portion of the upper base 1.

Since the penetrated portion of the upper base 1 does not remain as dead metal that is completely cut off, the penetrated portion is used for reinforcing joining strength of the upper base 1 and the lower base 2.

That is, the penetrated portion of the upper base 1 may be used for interlock and fastens the upper and lower bases 1 and 2.

Since the second portion 72 of the rivet portion 50 may fasten the upper and lower bases 1 and 2, rotation of the rivet stud bolt 100 against the upper and lower bases 1 and 2 may be prevented, and the joining characteristic and joining strength (joining torque) of the rivet stud bolt 100 and the upper and the lower bases 1 and 2 may be enhanced.

Also, since a plurality of slits 61 are formed to the rivet portion 50, the joining load of the punch unit 101 applied to the rivet portion 50 may be reduced, so that operation stability may be enhanced and material quantity of the stud bolt 100 may be reduced.

Since it is not required to form an assembling hole to the upper and lower bases 1 and 2, productivity may be improved, and manufacturing processes and manufacturing cost may be reduced.

In this case, a protruding portion 9 may be formed to a lower surface of the lower base 2 corresponding to the rivet portion 50.

Figure 10:
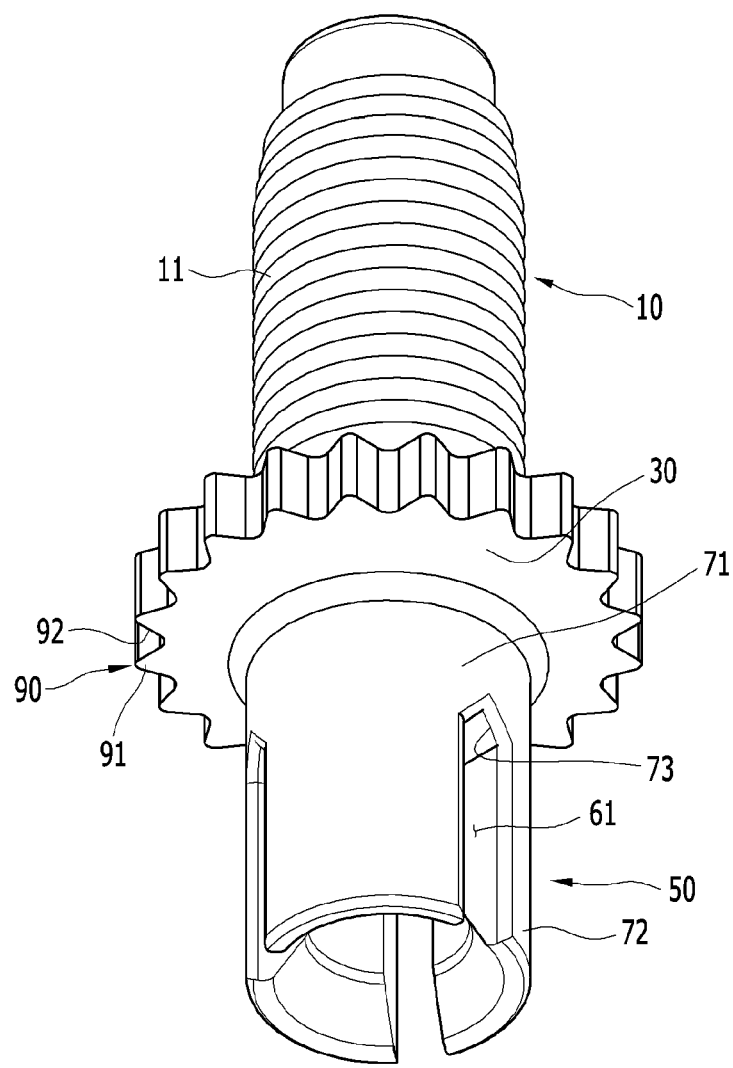
FIG. 10 is a perspective view of a stud bolt according to one or more variant exemplary embodiments of the present invention.
Figure 11:
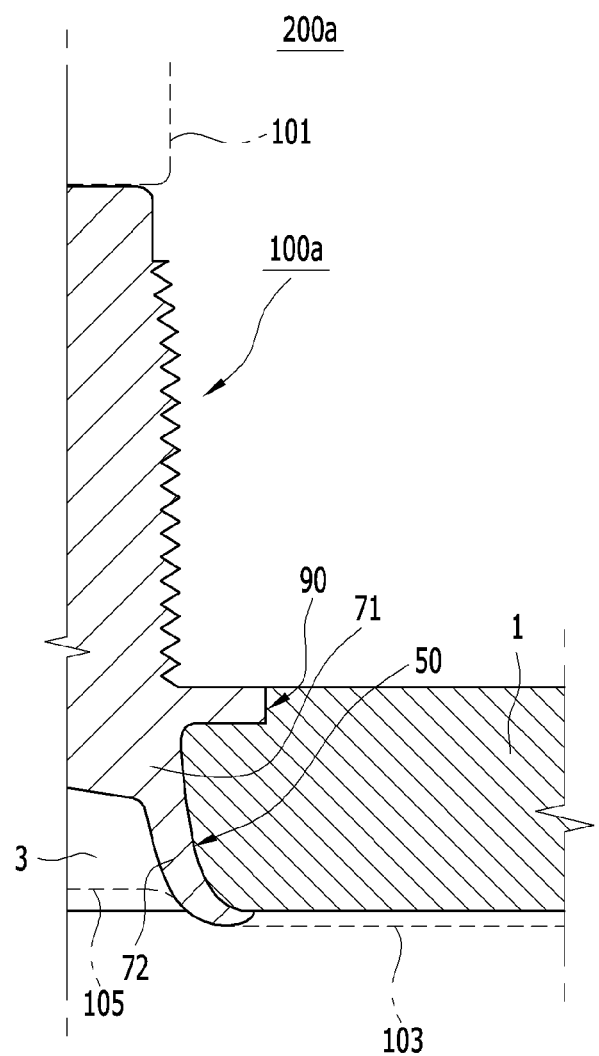
FIG. 11 is a drawing showing a first panel joint structure of the variant rivet stud bolt according to one or more exemplary embodiments of the present invention.

FIG. 10 is a perspective view of a stud bolt according to one or more variant exemplary embodiments of the present invention, and FIG. 11 is a drawing showing a first panel joint structure of the variant rivet stud bolt according to one or more exemplary embodiments of the present invention.

For better comprehension and ease of description, in describing a stud bolt showing in FIG. 10 and FIG. 11, the same constituent elements described referring to FIG. 1 to FIG. 9 are denoted by the same reference numerals in this specification, and repeated description will be omitted.

A stud bolt 100a of one or more exemplary variations of the present invention includes a rotation preventing portion 90 formed to an edge of the flange 3 for preventing rotation of the stud bolt 100a against the base or panel 1.

The rotation preventing portion 90 firmly connects the rivet stud bolt 100*a* to the base 1.

For example, when torque is applied to a nut to fasten an element to be mounted to the bolt portion 10, the rotation preventing portion 90 may prevent the rivet stud bolt 100*a* from being rotated against the base 1.

The rotation preventing portion 90 may be formed as teeth continuously formed to the edge of the flange 30 including protrusions 91 and depressed portions 92.

The protrusions 91 are formed along the edge of the flange 30 and the depressed portions 92 are formed between the protrusions 91.

The rotation preventing portion 90 compresses to deform an upper portion of the base 1 when the rivet portion 50 is pressed by the punch unit 101 corresponding to the shapes of the protrusions 91 and the depressed portions 92, and the protrusions 91 supply a rotation preventing force against the base 1.

That is, the rotation preventing portion 90 forms a deformed portion (referring to 13 of FIG. 15) corresponding to the shapes of the protrusions 91 and the depressed portions 92 when the rivet portion 50 is connected to the base 1 so as to supply the rotation preventing force.

FIG. 11 is a drawing showing a first panel joint structure of the variant rivet stud bolt according to one or more exemplary embodiments of the present invention.

Referring to FIG. 11, a first panel joint structure 200*a* of the variant rivet stud bolt 100*a* according to one or more exemplary embodiments is formed with at least one base 1, for example with at least one panel of which an assembling hole 3 is formed thereto, and the rivet stud bolt 100*a* mechanically connected to the base 1.

For forming the first panel joint structure 200*a*, the rivet stud bolt 100*a* is supplied to the punch unit 101 of the stud bolt joining system, and the base 1 where the assembling hole 3 is formed thereto is disposed between the punch unit 101 and the die 103. Then, the rivet portion 50 of the rivet stud bolt 100*a* is inserted into the assembling hole 3, and then the punch unit 101 applies a load to the rivet stud bolt 100*a*.

Then, in a state in which the second portion 72 of the rivet portion 50 is supported by the first portion 71, the second portion 72 of the rivet portion 50 is outwardly deformed according to the forming groove 105 of the die 13 by the load of the punch unit 101, and is press-fitted into the lower portion of the base 1 through the slits 61 with a plurality of jointing portions.

That is, for example, since the second portion 72 is divided into three sections by the slits 61, the rivet portion 50 is plastically deformed and is press-fitted to three jointing portions of the base 1.

The rivet portion 50 penetrates the assembling hole 3, is outwardly plastically deformed, and is connected to the lower portion of the base 1 as a staple shape with a plurality of jointing portions.

In this case, the rotation preventing portion 90 forms the deformed portion 13 corresponding to the shapes of the protrusions 91 and the depressed portions 92. Thus, the flange 30 with the rotation preventing portion 90 is firmly connected to the upper portion of the base 1.

According to the first panel joint structure 200*a* of the variant exemplary embodiments of the present invention, since the rivet portion 50 is plastically deformed and the second portion 72 is press-fitted to a plurality of jointing portions of the base 1 through the slits 61, the joining characteristic and joining strength (joining torque) of the rivet stud bolt 100*a* and the base 1 may be enhanced.

Also, since the rotation preventing portion 90 forms the deformed portion 13 corresponding to the shapes of the protrusions 91 and the depressed portions 92 to supply the rotation preventing force, joining strength may be enhanced.

Figure 12:
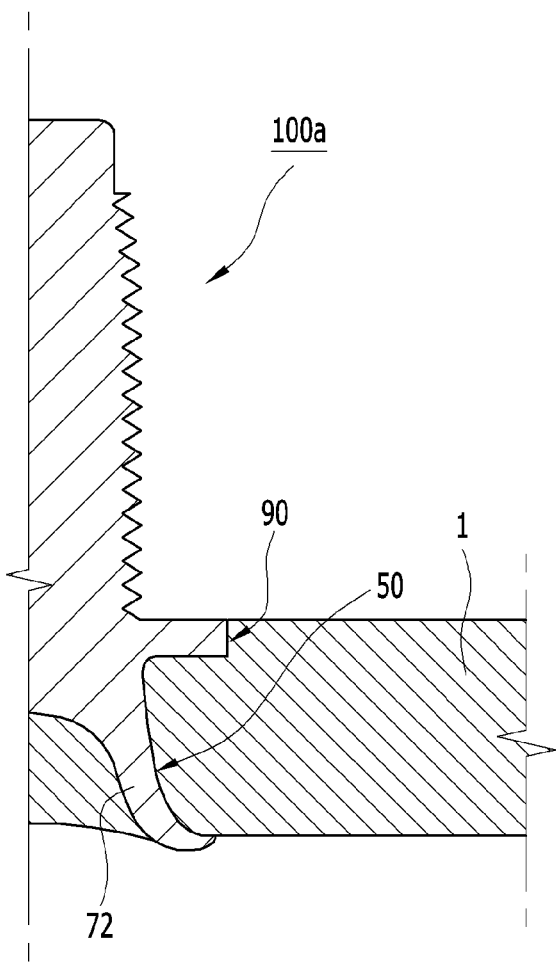
FIG. 12 is a drawing showing a second panel joint structure of the variant rivet stud bolt according to one or more exemplary embodiments of the present invention.

FIG. 12 is a drawing showing a second panel joint structure of the variant rivet stud bolt according to one or more exemplary embodiments of the present invention.

Referring to FIG. 12, a second panel joint structure 300*a* of the variant rivet stud bolt 100*a* according to one or more exemplary embodiments is formed with at least one base 1, for example with at least one panel without an assembling hole 3, and the rivet stud bolt 100*a* mechanically connected to the base 1.

Similar to the exemplary embodiment shown in FIG. 5 and FIG. 6, since the second portion 72 is divided into three sections by the slits 61, the rivet portion 50 is plastically deformed and is press-fitted to three jointing portions of the base 1, and the rivet portion 50 connects a portion of the base 1 corresponding to the inner space with other portions of the base 1 corresponding to the slits 61.

When the second portions 72 penetrate the base 1, the portion corresponding to the inner space of the second portions 72 is not cut off and is connected to the other portion of the base 1 corresponding to the slits 61.

Since the portion of the base 1 corresponding to the inner space of the second portions 72 can be connected to the other portions of the base 1 corresponding to the slits 61 by the slits 61 of the rivet portion 50, the penetrated portion of the base 1 is not cut off completely. Thus, mechanical interlock may be achieved.

The second portion 72 of the rivet portion 50 penetrates the base 1, is outwardly plastically deformed, and is connected to the lower portion of the base 1 as a staple shape with a plurality of jointing portion.

Also, since the rotation preventing portion 90 forms the deformed portion 13 corresponding to the shapes of the protrusions 91 and the depressed portions 92 to supply the rotation preventing force, joining strength may be enhanced.

Figure 13:
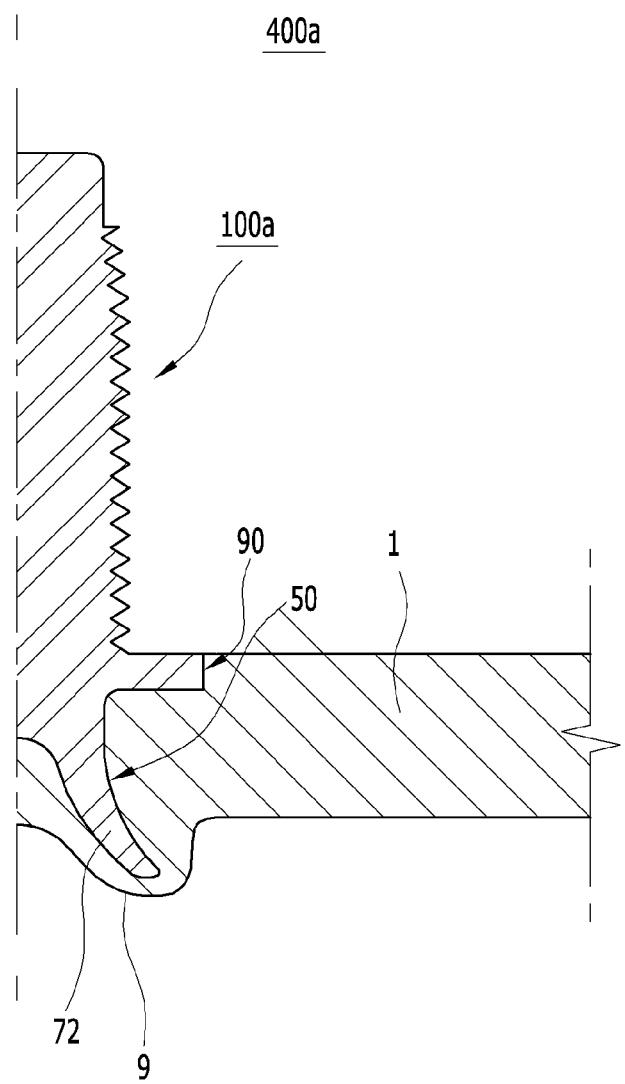
FIG. 13 is a drawing showing a third panel joint structure of the variant rivet stud bolt according to one or more exemplary embodiments of the present invention.

FIG. 13 is a drawing showing a third panel joint structure of the variant rivet stud bolt according to one or more exemplary embodiments of the present invention.

Referring to FIG. 13, a third panel joint structure 400*a* according to variant exemplary embodiments of the present invention is formed with at least one base 1, for example with at least one panel of which an assembling hole 3 is not formed thereto, and the rivet stud bolt 100*a* mechanically connected to the base 1 without completely penetrating the base 1.

Similar to the exemplary embodiment shown in FIG. 5 and FIG. 7, the second portions 72 are outwardly deformed to be press-fitted into the lower portion of the base 1, a portion corresponding to the inner space of the second portions 72 are not cut off and are connected to the other portion of the base 1 corresponding to the slits 61. Thus, mechanical interlock may be achieved.

Also, since the rotation preventing portion 90 forms the deformed portion 13 corresponding to the shapes of the protrusions 91 and the depressed portions 92 to supply the rotation preventing force, joining strength may be enhanced.

Figure 14:
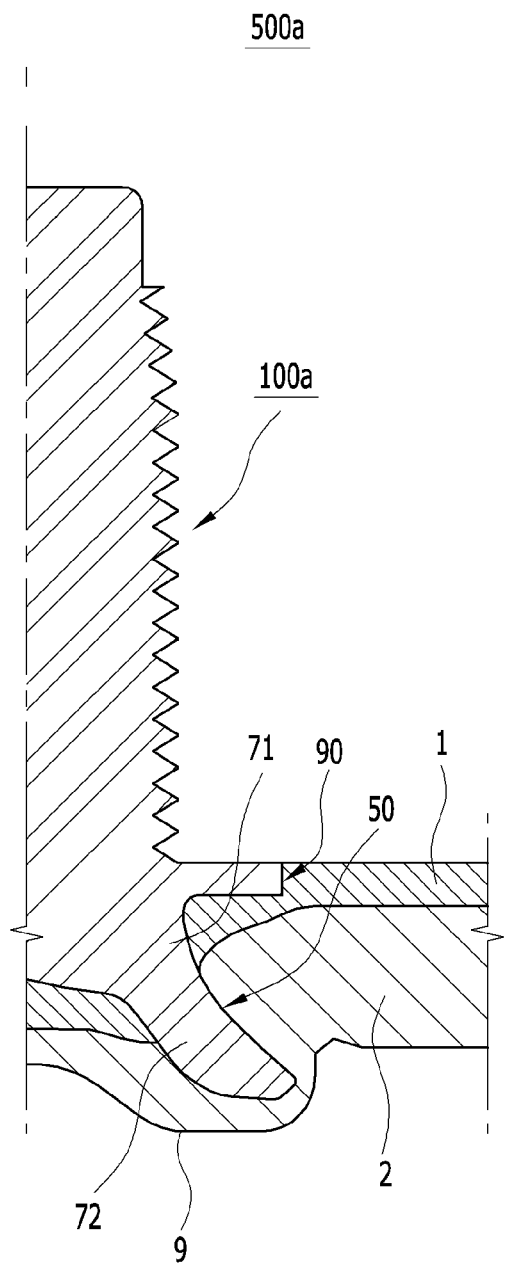
FIG. 14 and FIG. 15 are drawings showing a fourth panel joint structure of the variant rivet stud bolt according to one or more exemplary embodiments of the present invention.
Figure 15:
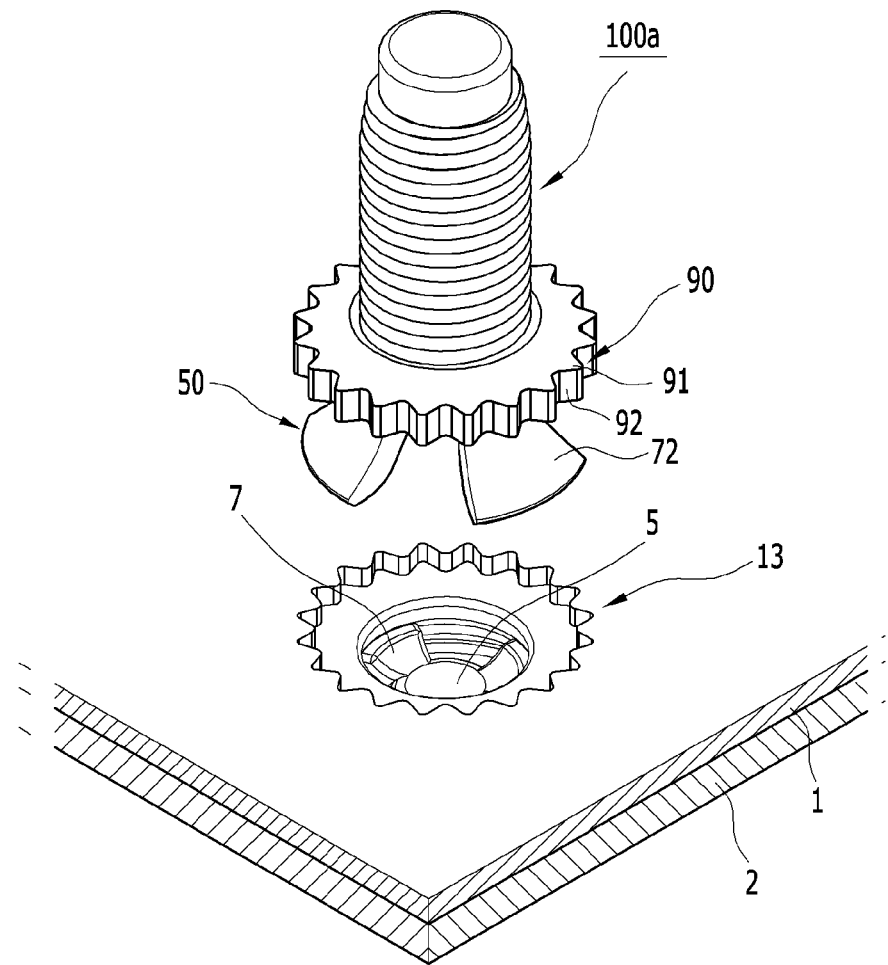

FIG. 14 and FIG. 15 are drawings showing a fourth panel joint structure of the variant rivet stud bolt according to one or more exemplary embodiments of the present invention.

FIG. 14 and referring to FIG. 15, a fourth panel joint structure 500*a* according to variant exemplary embodiments of the present invention is formed with at least two bases 1 and 2, for example with at least two panels of which an assembling hole 3 is not formed thereto, and the rivet stud bolt 100a mechanically connected to the bases 1 and 2.

The second portion 72 of the rivet portion 50 penetrates the upper base 1, is outwardly plastically deformed along the forming groove 105 of the die 103, and is press-fitted into the lower base 2 to integrally connect the upper and lower bases 1 and 2.

The second portion 72 is pressed to be fitted into the lower base 2 but does not completely penetrate the lower base 2, and deformed ends are encapsulated within the lower base 2 so that mechanical interlock between the upper and lower bases 1 and 2 is formed to integrally connect the upper and lower bases 1 and 2.

Also, since the rotation preventing portion 90 forms the deformed portion 13 corresponding to the shapes of the protrusions 91 and the depressed portions 92 to supply the rotation preventing force, joining strength may be enhanced.

Figure 16:
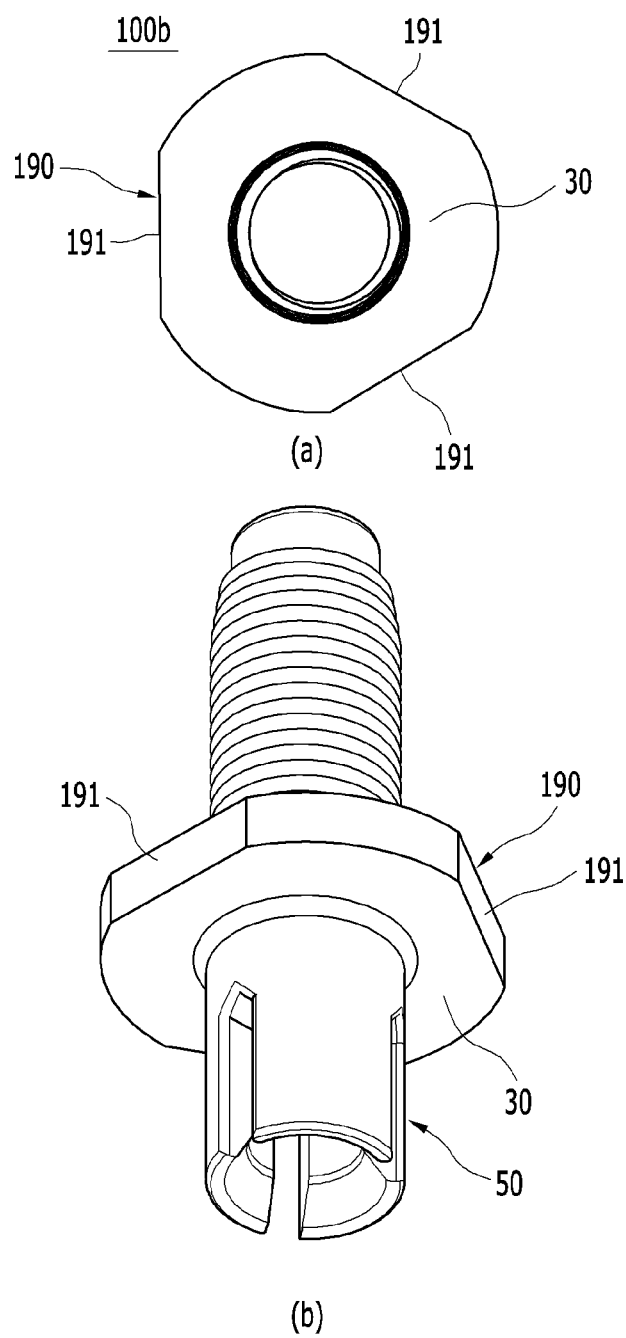
Figure 18:
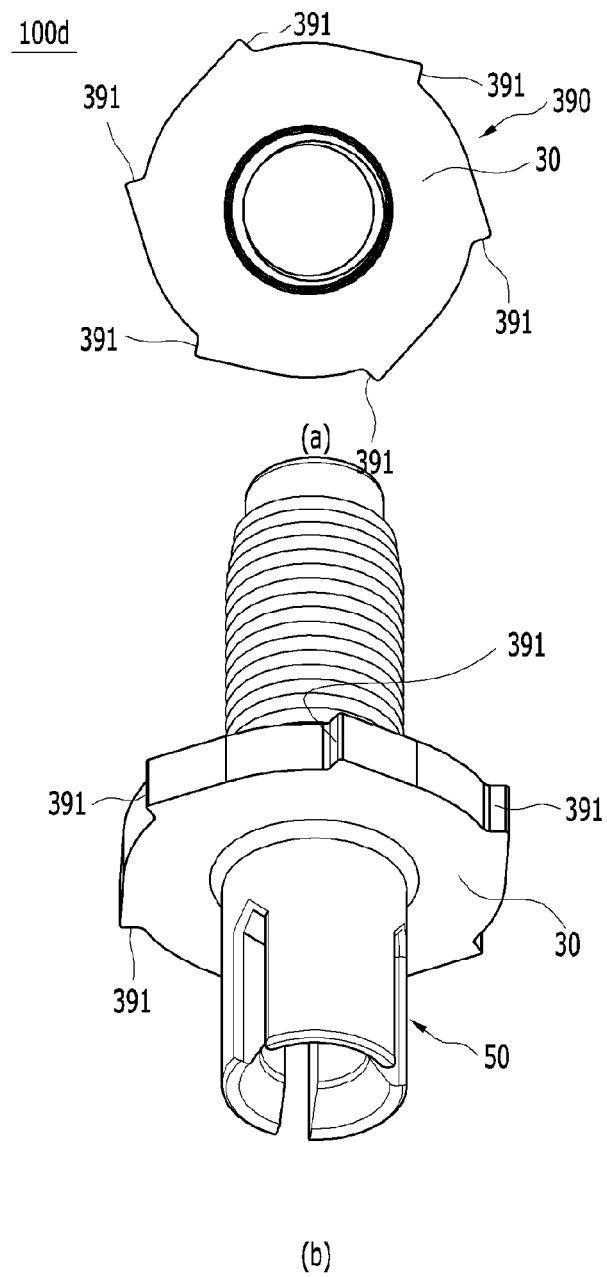

FIG. 16 to FIG. 18 are drawings showing a stud bolt according to one or more other variant exemplary embodiments of the present invention.

Referring to FIG. 16, a rivet stud bolt 100b according to variant exemplary embodiments of the present invention includes a rotation preventing portion 190 including at least one straight portion 191 formed to the flange 30.

For example, the rotation preventing portion 190 includes three straight portions 191 formed to the edge of the flange 30 at 120 degree intervals.

The rotation preventing portion 190 forms a deformed portion (referring to 13 of FIG. 15) corresponding to the shapes of three straight portions 191 when the rivet portion 50 is connected to the base 1 so as to supply the rotation preventing force.

Referring to FIG. 17, a rivet stud bolt 100c according to variant exemplary embodiments of the present invention includes a rotation preventing portion 290 including six straight portions 291 formed to the edge of the flange 30.

That is, the rotation preventing portion 290 includes six straight portions 291 formed to the edge of the flange 30 at 60 degree intervals.

The rotation preventing portion 290 forms a deformed portion (referring to 13 of FIG. 15) corresponding to the shapes of six straight portions 291 when the rivet portion 50 is connected to the base 1 so as to supply the rotation preventing force.

Referring to FIG. 18, a rivet stud bolt 100d according to variant exemplary embodiments of the present invention includes a rotation preventing portion 390 including a plurality of protrusions 391 formed to the edge of the flange 30.

In an exemplary embodiment of the present invention, the rotation preventing portion 390 includes a plurality of the protrusions 391 protruded in a substantially vertical direction of the edge of the flange 30 at predetermined intervals.

The rotation preventing portion 390 forms a deformed portion (referring to 13 of FIG. 15) corresponding to the shapes of the protrusions 391 when the rivet portion 50 is connected to the base 1 so as to supply the rotation preventing force.

Since schemes and functions of the rivet stud bolts 100a, 100b, 100c, and 100d according to variant exemplary embodiments of the present invention are similar to the rivet stud bolt 100 described above, detailed description will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rivet stud bolt comprising:
   a bolt portion to which the panel is assembled;
   a flange integrally formed to an end of the bolt portion; and
   a rivet portion integrally connected to the flange, in which at least two slits are formed, and the rivet portion is plastically deformable by a pressure,
   wherein the flange is extended in a radial direction with respect to a common axis of the bolt portion and the rivet portion and has a shape of a saw-toothed wheel that has an upper surface and a lower surface perpendicular to the common axis and a lateral surface that connects outer edges of the upper surface and the lower surface and is formed of continuous triangular teeth.

2. The rivet stud bolt of claim 1, wherein:
   the rivet portion is formed as a cylinder shape shank;
   the rivet portion includes a connecting end connected to the flange and a free end being an opposite end of the connecting end; and
   the slits are extended from the free end to the connecting end of the rivet portion.

3. The rivet stud bolt of claim 2, wherein a length of the slit is shorter than that of the rivet portion, and the slits are circumferentially disposed at the rivet portion at a constant interval.

4. The rivet stud bolt of claim 2, wherein the rivet portion comprises:
   a first portion integrally connected to the flange and having a circular cross-section; and
   a plurality of second portions integrally connected to the first portion and disposed between the slits.

5. The rivet stud bolt of claim 4, wherein the slit is provided with a triangular groove at the first portion, and the groove is connected to a space between the second portions.

6. A panel joint structure mounting an element to an at least one panel with the rivet stud bolt of claim 1, wherein:
   the rivet portion of the rivet stud bolt is inserted into an assembling hole of the panel; and
   the rivet portion is deformed to be connected to a plurality of jointing portions of the panel, thereby being press-fitted to the panel.

7. The panel joint structure of claim 6, wherein the rivet portion is inserted into the assembling hole and is outwardly deformed by a pressure applied from the bolt portion, thereby being connected to the panel in a staple shape.

8. A panel joint structure mounting an element to an at least one panel with the rivet stud bolt of claim 1, wherein:
   the rivet portion of the rivet stud bolt penetrates the panel and is outwardly deformed to be connected to a plurality of jointing portions of the panel by a pressure applied from the bolt portion, thereby being press-fitted to the panel.

9. The panel joint structure of claim 8, wherein the rivet portion completely penetrates the panel, thereby a free end of the rivet portion being exposed toward a side of the panel opposite to another side where the flange is disposed.

10. The panel joint structure of claim 8, wherein the panel has a deformed portion in a shape corresponding to the flange, the deformed portion is formed by pressing of the flange.

11. A panel joint structure mounting an element to an at least one panel with the rivet stud bolt of claim 1, wherein:

the rivet portion of the rivet stud bolt is outwardly deformed and is press-fitted into a plurality of jointing portions of the panel without complete penetration of the panel.

12. The panel joint structure of claim 11, wherein a protruding portion is formed to a lower surface of the panel corresponding to the rivet portion.

13. A panel joint structure mounting an element to a plurality of panels with the rivet stud bolt of claim 1, wherein:
the rivet portion of the rivet stud bolt penetrates upper panels but a lowest panel and is outwardly deformed to be press-fitted into a plurality of jointing portions of the lowest panel by a pressure applied from the bolt portion.

14. The panel joint structure of claim 13, wherein the panels are integrally assembled by the rivet portion.

15. The panel joint structure of claim 13, wherein a protruding portion is formed to a lower surface of the lowest panel corresponding to the rivet portion.

16. The panel joint structure of claim 13, the upper panel have a deformed portion in a shape corresponding to the flange, the deformed portion is formed by pressing of the flange.

17. A rivet stud bolt comprising:
a bolt portion to which the panel is assembled;
a flange integrally formed to an end of the bolt portion; and
a rivet portion integrally connected to the flange, in which at least two slits are formed, and the rivet portion is plastically deformable by a pressure,
wherein the flange is extended in a radial direction with respect to a common axis of the bolt portion and the rivet portion and has a shape of a saw-toothed wheel that has an upper surface and a lower surface perpendicular to the common axis and a lateral surface that connects outer edges of the upper surface and the lower surface and has a plurality of flat surfaces and a plurality of chamfered surfaces disposed between the flat surfaces, and
wherein each of the chamfered surfaces connects two adjacent surfaces of the flat surfaces.

18. The rivet stud bolt of claim 17, wherein the lateral surface of the flange consists of six flat surfaces and six chamfered surfaces.

19. A rivet stud bolt comprising:
a bolt portion to which the panel is assembled;
a flange integrally formed to an end of the bolt portion; and
a rivet portion integrally connected to the flange, in which at least two slits are formed, and the rivet portion is plastically deformable by a pressure,
wherein the flange is extended in a radial direction with respect to a common axis of the bolt portion and the rivet portion and has a shape of a saw-toothed wheel that has an upper surface and a lower surface perpendicular to the common axis and a lateral surface that connects outer edges of the upper surface and the lower surface and has a plurality of protrusions at a predetermined interval and
wherein each of the protrusions has a first slope and a second slope steeper than the first slope.

* * * * *